US012695228B2

(12) United States Patent
Asano et al.

(10) Patent No.: US 12,695,228 B2
(45) Date of Patent: Jul. 28, 2026

(54) CONNECTOR DEVICE INCLUDING CONDUCTIVE PORTION

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Yasunori Asano, Mie (JP); Yutaka Kobayashi, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 313 days.

(21) Appl. No.: 18/568,480

(22) PCT Filed: Jun. 3, 2022

(86) PCT No.: PCT/JP2022/022629
§ 371 (c)(1),
(2) Date: Dec. 8, 2023

(87) PCT Pub. No.: WO2022/270276
PCT Pub. Date: Dec. 29, 2022

(65) Prior Publication Data

US 2024/0275094 A1 Aug. 15, 2024

(30) Foreign Application Priority Data

Jun. 24, 2021 (JP) ................................ 2021-104504

(51) Int. Cl.
*H01R 12/91* (2011.01)
*H01R 12/71* (2011.01)
*H01R 31/06* (2006.01)

(52) U.S. Cl.
CPC ........... *H01R 12/91* (2013.01); *H01R 12/718* (2013.01); *H01R 31/06* (2013.01)

(58) Field of Classification Search
CPC ...... H01R 12/91; H01R 12/718; H01R 31/06; H01R 12/7082; H01R 12/716;
(Continued)

(56) References Cited

U.S. PATENT DOCUMENTS 6,497,579 B1 * 12/2002 Garbini .............. H01R 13/6315 439/246
8,801,459 B2 * 8/2014 Mrowka ................ H01R 24/54 439/246
(Continued)

FOREIGN PATENT DOCUMENTS

WO WO-2021095485 A1 * 5/2021 ......... H01R 13/6588

OTHER PUBLICATIONS

International Search Report issued on Aug. 16, 2022 for WO 2022/270276 A1 (4 pages).

*Primary Examiner* — Edwin A. Leon
(74) *Attorney, Agent, or Firm* — Venjuris, P.C.

(57) ABSTRACT

A connector device (A) is provided with a pair of circuit boards (11, 21) including board transmission paths (13, 23) and arranged to face each other, a pair of connectors (14, 24) to be mounted on the pair of circuit boards (11, 21), a plurality of adapters (60) including relay outer conductors (63) and configured to connect the pair of connectors (14, 24), and an electrically conductive member (40) made of metal to make a plurality of the relay outer conductors (63) conductive. The board transmission paths (13, 23) are
(Continued)

arranged outside an inclusion region (R) including the plurality of adapters (60) on a virtual projection plane (S) parallel to the circuit boards (11, 21). The electrically conductive member (40) is arranged only within the inclusion region (R) on the virtual projection plane (S).

6 Claims, 13 Drawing Sheets

(58) Field of Classification Search
CPC .... H01R 12/73; H01R 13/6588; H01R 24/50; H01R 13/631; H01R 2103/00; H01R 24/542; H01R 13/6596
See application file for complete search history.

(56) References Cited

U.S. PATENT DOCUMENTS

| | | | | |
|---|---|---|---|---|
| 10,249,968 | B2 * | 4/2019 | Dandl .................. | H01R 12/716 |
| 2013/0102181 | A1 * | 4/2013 | Aimoto ................ | H01R 13/187<br>439/350 |
| 2015/0126061 | A1 | 5/2015 | Paynter | |
| 2022/0368051 | A1 | 11/2022 | Asano et al. | |
| 2022/0393411 | A1 | 12/2022 | Asano et al. | |

* cited by examiner

CONNECTOR DEVICE INCLUDING CONDUCTIVE PORTION

CROSS REFERENCE TO RELATED APPLICATIONS

This application is a national phase of PCT application No. PCT/JP2022/022629, filed on 3 Jun. 2022, which claims priority from Japanese patent application No. 2021-104504, filed on 24 Jun. 2021, all of which are incorporated herein by reference.

TECHNICAL FIELD

The present disclosure relates to a connector device.

BACKGROUND

Patent Document 1 discloses a connector device provided with a pair of connectors to be individually mounted on a pair of circuit boards and a plurality of adapters provided between the pair of connectors. A plurality of terminal units each composed of an inner conductor, a dielectric and an outer conductor are mounted in the connector. The adapter is a rod-like member including an inner conductor, a dielectric and an outer conductor. Both end parts of the plurality of adapters are individually connected to the plurality of terminal units. The misalignment of the pair of circuit boards is absorbed by swinging the adapters. The plurality of adapters are held to be integrally swingable by an alignment member.

PRIOR ART DOCUMENT

Patent Document

Patent Document 1: JP 2021-077601 A

SUMMARY OF THE INVENTION

Problems to be Solved

The alignment member is in the form of a plate parallel to the circuit boards and includes a plurality of through holes for allowing the plurality of adapters to be passed therethrough. On a virtual projection plane parallel to the circuit boards, the alignment member has a size extending over a relatively wide range and board transmission paths formed on the circuit boards and the alignment member partially overlap. The alignment member is made of metal and also has a function of holding the outer conductors of the plurality of adapters at the same potential. Thus, there is a concern that resonance occurs between the board transmission paths and the alignment member made of metal. If resonance occurs, the communication performance of a communication circuit constituted by the board transmission paths, the terminal units and the adapters is reduced.

A connector device of the present disclosure was completed on the basis of the above situation and aims to suppress the occurrence of resonance.

Means to Solve the Problem

The present disclosure is directed to a connector device with a pair of circuit boards including board transmission paths, the circuit boards being arranged to face each other, a pair of connectors to be individually mounted on the pair of circuit boards, a plurality of adapters including outer conductors, the adapters connecting the pair of connectors, and an electrically conductive member made of metal, the electrically conductive member making a plurality of the outer conductors conductive, the board transmission paths being arranged outside an inclusion region including the plurality of adapters on a virtual projection plane parallel to the circuit boards, and the electrically conductive member being arranged only within the inclusion region on the virtual projection plane.

Effect of the Invention

According to the present disclosure, the occurrence of resonance can be suppressed.

DESCRIPTION OF EMBODIMENTS

Description of Embodiments of Present Disclosure

Figure 1:
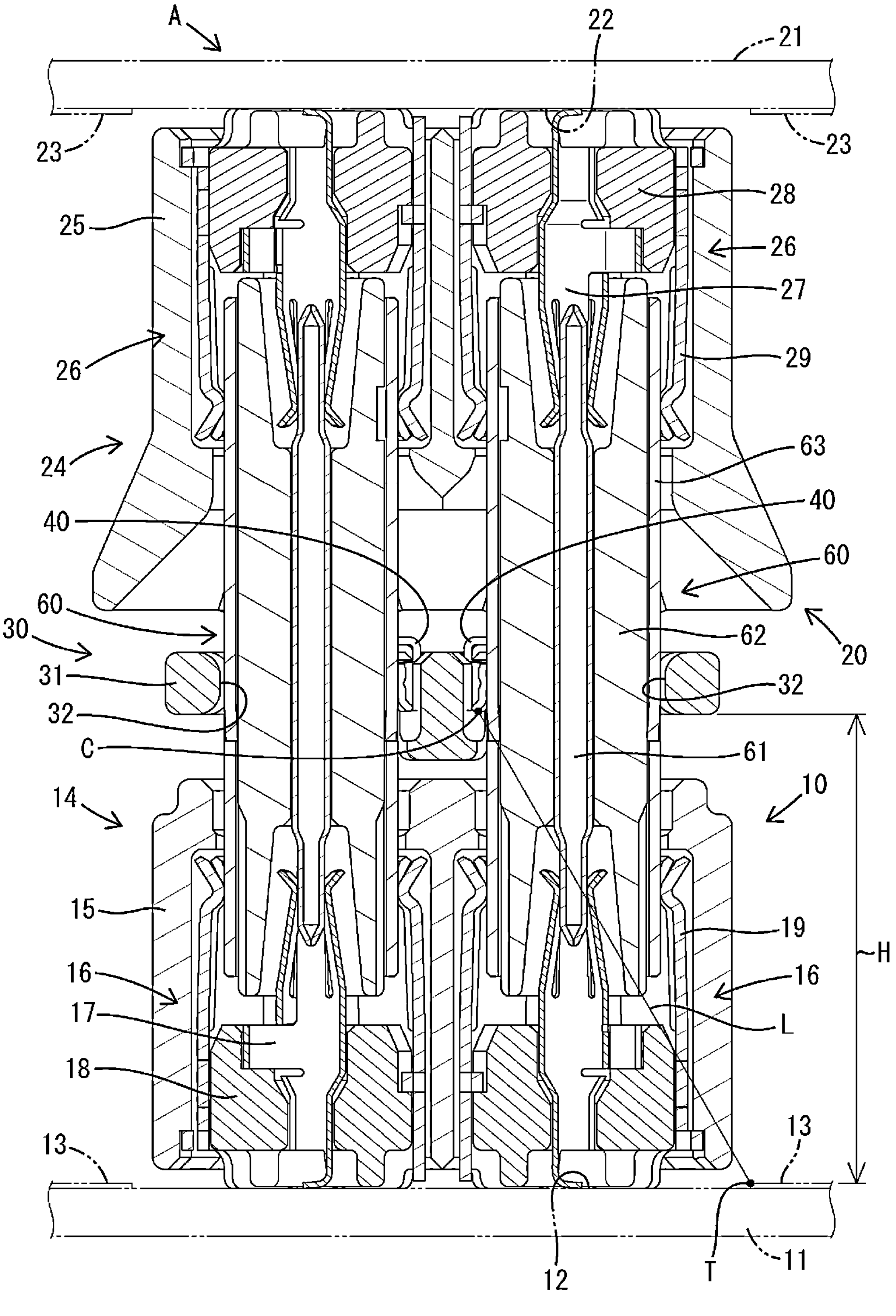
FIG. 1 is a front view in section of a connector device of a first embodiment.

First, embodiments of the present disclosure are listed and described.

(1) The connector device of the present disclosure is provided with a pair of circuit boards including board transmission paths, the circuit boards being arranged to face each other, a pair of connectors to be individually mounted on the pair of circuit boards, a plurality of adapters including outer conductors, the adapters connecting the pair of connectors, and an electrically conductive member made of metal, the electrically conductive member making a plurality of the outer conductors conductive, the board transmission paths being arranged outside an inclusion region including the plurality of adapters on a virtual projection plane parallel to the circuit boards, and the electrically conductive member being arranged only within the inclusion region on the virtual projection plane. According to the configuration of the present disclosure, on the virtual projection plane, the board transmission paths are arranged outside the inclusion region including the plurality of adapters, whereas the electrically conductive member is arranged only within the inclusion region including the plurality of adapters. Since the electrically conductive member is disposed at a position separated from the board transmission paths on the virtual projection plane, the occurrence of resonance between the board transmission paths and the electrically conductive member can be suppressed.

(2) Preferably, the plurality of adapters are aligned and arranged side by side along two perpendicular directions on the virtual projection plane, and the electrically conductive member is arranged to be sandwiched between adjacent ones of the adapters. According to this configuration, since the adapters are interposed between the board transmission paths and the electrically conductive member on the virtual projection plane, it is possible to ensure relatively large distances between the board transmission paths and the electrically conductive member.

(3) Preferably, an electrically nonconductive alignment member is provided which integrally swingably holds the plurality of adapters, and the electrically conductive member is attached to the alignment member. According to this configuration, since the electrically conductive member needs not have a function of integrally swingably holding the plurality of adapters, the electrically conductive member can be suppressed to a minimum necessary size.

(4) Preferably in (3), the electrically conductive member is a single component including resilient contact portions to be brought into resilient contact with the outer conductors, a press-fit portion to be press-fit into the alignment member and a linking portion linking the resilient contact portions and the press-fit portion. According to this configuration, since the press-fit portion is separated from the resilient contact portions via the linking portion, it can be suppressed that stress generated in the resilient contact portion is applied to the press-fit portion when the resilient contact portion is resiliently deformed by resiliently contacting the outer conductor.

(5) Preferably in (4), the electrically conductive member is made from a press-worked plate having a cut surface exposed on an outer peripheral edge, the alignment member includes through holes for allowing the adapters to be passed therethrough, the resilient contact portions are arranged along hole edges of the through holes, and the resilient contact portion is formed with a bent portion bent to keep the cut surface away from the adapter in a radial direction of the through hole. According to this configuration, the outer peripheral surface of the outer conductor can be prevented from being damaged by the edge of the cutting surface of the resilient contact portion.

Details of Embodiments of Present Disclosure

First Embodiment

A first specific embodiment of a connector device of the present disclosure is described with reference to FIGS. 1 to 7. Note that the present invention is not limited to these illustrations, but is represented by claims and intended to include all changes in the scope of claims and in the meaning and scope of equivalents. In the first embodiment, an X-X direction in FIGS. 2 to 4 and 6 is defined as a front-rear direction. A Y-Y direction in FIGS. 2 to 6 is defined as a lateral direction. AZ-Z direction in FIGS. 2, 3, 5 and 6 is defined as a vertical direction. Upper and lower sides shown in FIGS. 1 to 3, 5 and 6 are directly defined as upper and lower sides.

As shown in FIG. 1, a connector device A of the first embodiment is provided with a first board module 10, a second board module 20 and a relay module 30. The second board module 20 is arranged above the first board module 10 to face the first board module 10 in the vertical direction. The relay module 30 is arranged between the first and second board modules 10, 20 and connects the both board modules 10, 20. The relay module 30 also has a function of absorbing the misalignment of the first and second board modules 10, 20 in a horizontal direction.

The first board module 10 is provided with a first circuit board 11 horizontally arranged with a first mounting surface 12 facing up and a first connector 14 mounted on the first mounting surface 12. First board transmission paths 13 are formed outside a rectangular region, where the first connector 14 is arranged, out of the first mounting surface 12.

The first connector 14 is provided with a first housing 15 and six first shield terminals 16 mounted in the first housing 15. The six first shield terminals 16 are aligned and arranged in the front-rear direction and lateral direction in a plan view of the first circuit board 11. The first shield terminals 16 are arranged separately in two left and right rows and three first shield terminals 16 are juxtaposed in the front-rear direction in each row. Each first shield terminal 16 is configured such that a first board-side inner conductor 17 is accommodated in a first board-side dielectric 18 and the first board-side dielectric 18 is surrounded by a first board-side outer conductor 19.

The second board module 20 is provided with a second circuit board 21 horizontally arranged with a second mounting surface 22 facing down and a second connector 24 mounted on the second mounting surface 22. Second board transmission paths 23 are formed outside a rectangular region, where the second connector 24 is arranged, out of the second mounting surface 22.

The second connector 24 is provided with a second housing 25 and six second shield terminals 26 mounted in the second housing 25. The six second shield terminals 26 are aligned and arranged in the front-rear direction and lateral direction in a bottom view of the second circuit board 21. The second shield terminals 26 are arranged separately in two left and right rows and three second shield terminals 26 are juxtaposed in the front-rear direction in each row. Each second shield terminal 26 is configured such that a second board-side inner conductor 27 is accommodated in a second board-side dielectric 28 and the second board-side dielectric 28 is surrounded by a second board-side outer conductor 29.

Figure 2:
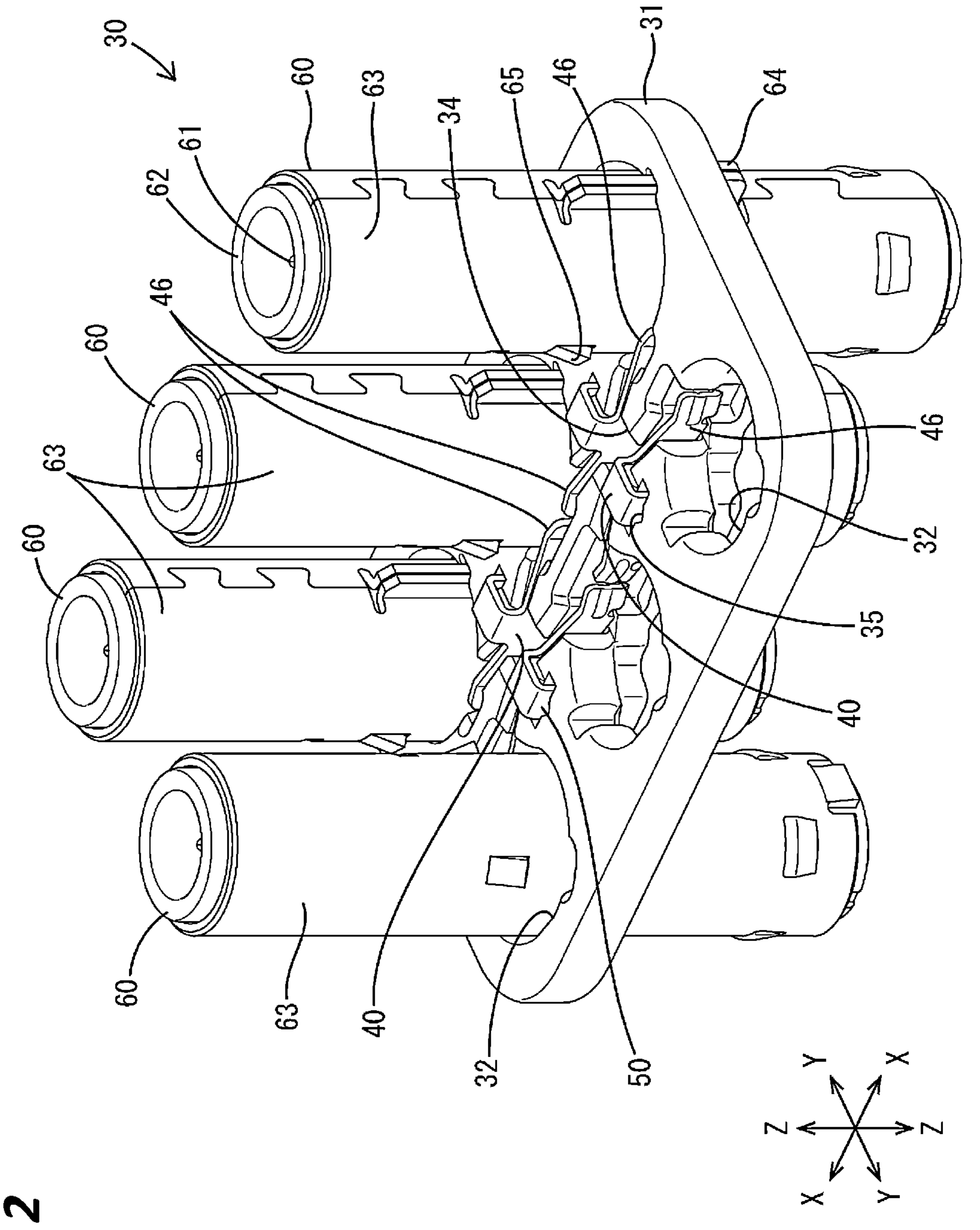
FIG. 2 is a perspective view showing a state where electrically conductive members and adapters are attached to an alignment member.

As shown in FIG. 2, the relay module 30 is provided with one alignment member 31, two electrically conductive members 40 and six adapters 60. The alignment member 31 is made of an insulating material such as synthetic resin and in the form of a plate having a plate thickness direction oriented in the vertical direction as a whole. The alignment member 31 has a rectangular shape having long sides extending in the front-rear direction as a whole in a plan view. The alignment member 31 is formed with six through holes 32 penetrating through the alignment member 31 in the vertical direction in the same arrangement as the first and second shield terminals 16, 26.

Figure 6:
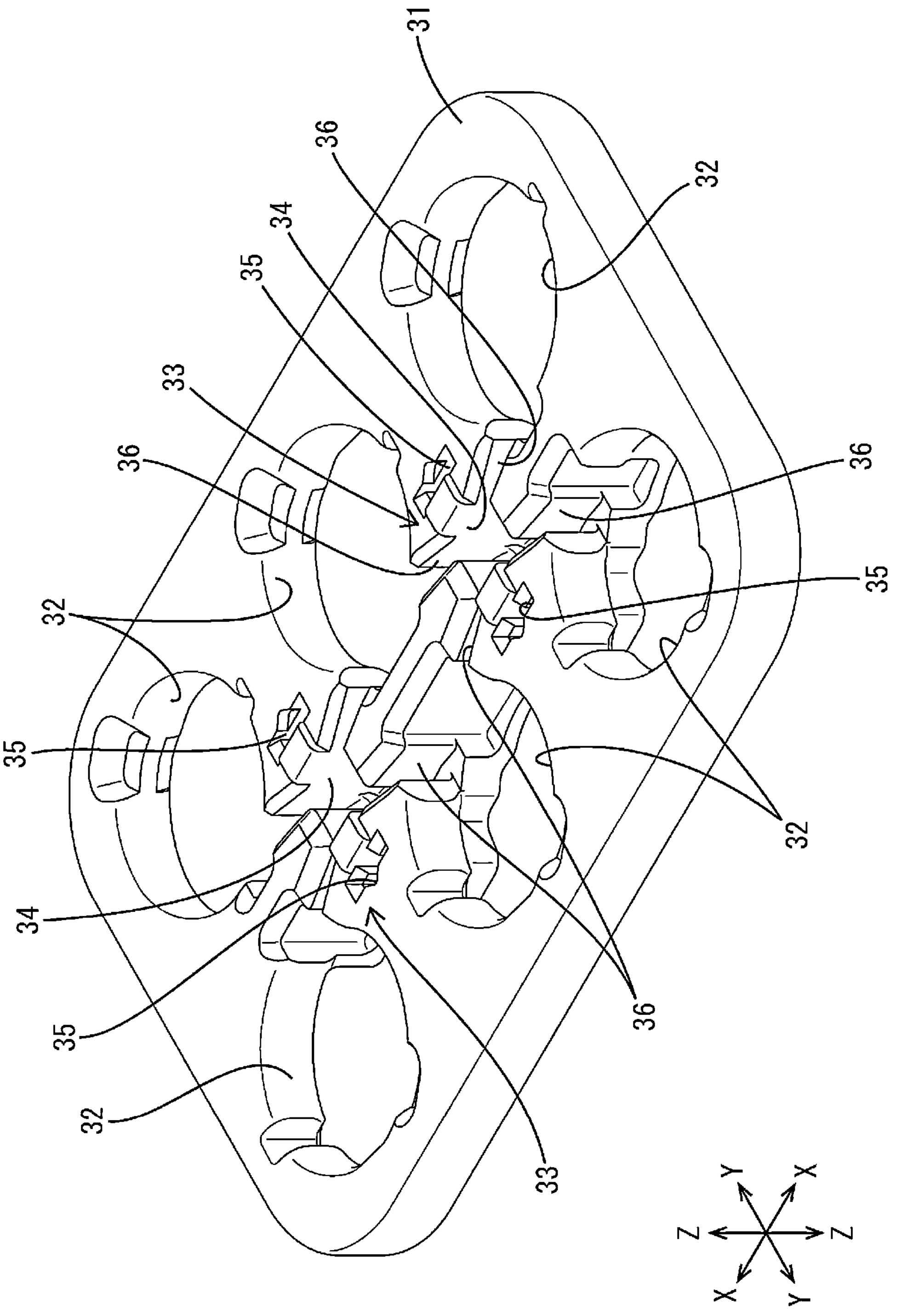
FIG. 6 is a perspective view of the alignment member.

As shown in FIG. 6, the alignment member 31 is formed with two front and rear accommodation recesses 33 formed by recessing the upper surface of the alignment member 31. The front accommodation recess 33 is arranged in a region surrounded by two front through holes 32 and two central through holes 32 in the front-rear direction. The rear front accommodation recess 33 is arranged in a region surrounded by two rear through holes 32 and the two central through holes 32 in the front-rear direction.

The accommodation recess 33 is composed of one central recess 34, a pair of left and right press-fit holes 35 and four groove portions 36. The central recess 34 is arranged in a region surrounded by four through holes 32 adjacent and aligned in the front-rear direction and lateral direction. The pair of press-fit holes 35 are arranged across the central recess 34 in the lateral direction. The four groove portions 36 are arranged to communicate the central recess 34 individually with the four through holes 32 surrounding the central recess 34.

Figure 3:
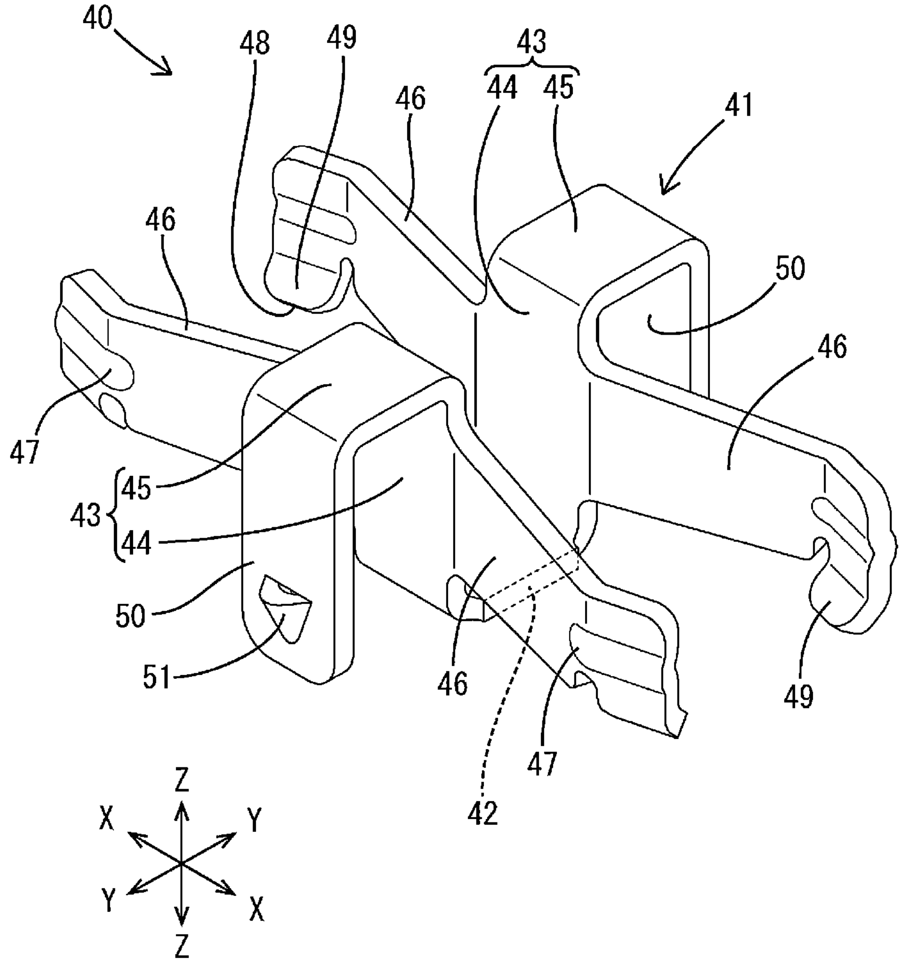
FIG. 3 is a perspective view of the electrically conductive member.
Figure 4:
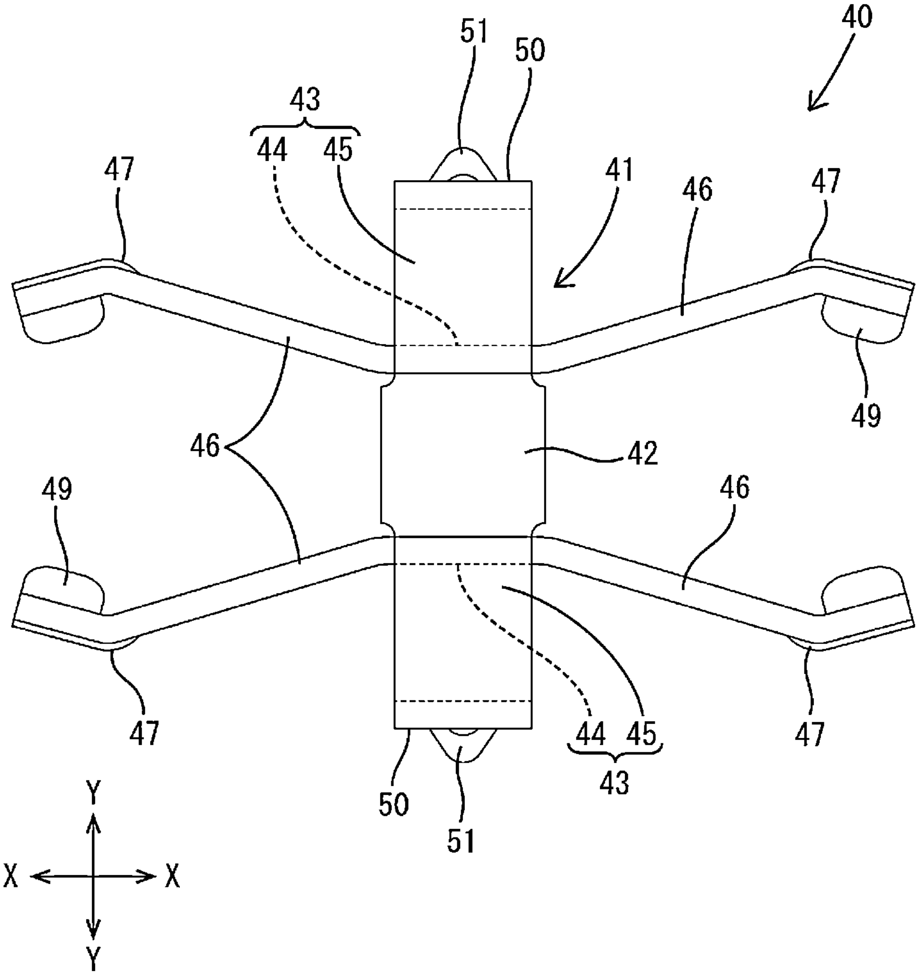
FIG. 4 is a plan view of the electrically conductive member.
Figure 5:
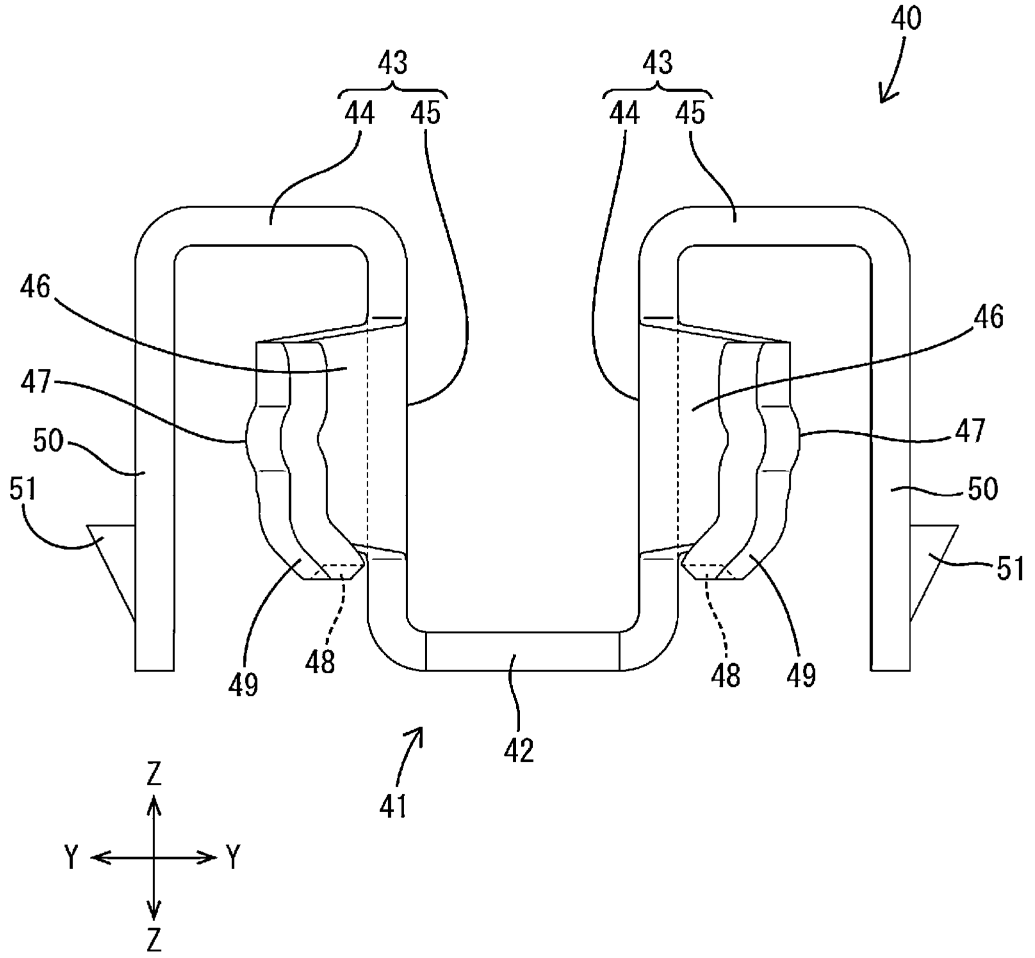
FIG. 5 is a front view of the electrically conductive member.

The electrically conductive member 40 is a single component formed, such as by bending a press-worked plate made of metal and stamped into a predetermined shape by press-working. The electrically conductive member 40 has a front-rear symmetrical and bilaterally symmetrical shape. As shown in FIGS. 3 to 5, the electrically conductive member 40 includes a base portion 41 having a bent shape, two pairs of front and rear resilient contact portions 46 and a pair of bilaterally symmetrical press-fit portions 50. The base portion 41 is composed of a horizontal lower plate portion 42 and a pair of left and right linking portions 43. The linking portions 43 are composed of a pair of left and right side plate portions 44 rising from both left and right side edges of the lower plate portion 42 and a pair of upper plate portions 45 connected at a right angle to the upper end edges of the both side plate portions 44. The pair of upper plate portions 45 horizontally extend in directions opposite to each other.

Two front resilient contact portions 46 are cantilevered forward from the front end edges of the side plate portions 44. The two front resilient contact portions 46 are spaced apart in the lateral direction, and bent into a chevron shape to bulge toward sides opposite to each other in a plan view. Two rear resilient contact portions 46 are cantilevered rearward from the rear end edges of the side plate portions 44. The two rear resilient contact portions 46 are spaced apart in the lateral direction, and bent into a chevron shape to bulge toward sides opposite to each other in a plan view. A top part of the chevron shape of the resilient contact portion 46 functions as a contact point portion 47 to be brought into contact with a relay outer conductor 63 of the adapter 60 to be described later. The resilient contact portion 46 can be resiliently displaced in the lateral direction with a boundary with the side plate portion 44 (base end part connected to the side plate portion 44) as a fulcrum.

Since the electrically conductive member 40 is made of the metal plate material stamped into the predetermined shape, cut surfaces 48 produced at the time of stamping (see FIGS. 3 and 5) are exposed downward on the lower end edges of the contact point portions 47. There is a concern that the edge of the cut surface 48 damages the outer peripheral surface of the adapter 60 to be described later when the adapter 60 is passed through the through hole 32. As a countermeasure against this, a lower end part of the contact point portion 47 is formed with a bent portion 49 bent toward a side opposite to a contact surface of the contact point portion 47 with the adapter 60. By forming the bent portion 49, the cut surface 48 is arranged at a position retracted from the contact point portion 47 toward a side opposite to the adapter 60 in a plan view.

The press-fit portion 50 is at a right angle to the upper plate portion 45 and cantilevered downward from the extending end edge of the upper plate portion 45. The press-fit portion 50 is formed with a retaining projection 51 by cutting and raising a part of the press-fit portion 50. One press-fit portion 50 is linked to two front and rear resilient contact portions 46 via the linking portion 43.

The electrically conductive member 40 is assembled with the alignment member 31 while being accommodated in the accommodation recess 33. Specifically, the base portion 41 is accommodated in the central recess 34, the resilient contact portions 46 are accommodated in the groove portions 36 and the press-fit portions 50 are press-fit into the press-fit holes 35. The retaining projections 51 of the press-fit portions 50 bite into the inner wall surfaces of the press-fit holes 35, whereby the electrically conductive member 40 is held assembled with the alignment member 31.

The contact point portions 47 of the front resilient contact portions 46 formed in the front electrically conductive member 40 are arranged in the front through holes 32. The contact point portions 47 of the rear resilient contact portions 46 formed in the rear electrically conductive member 40 are arranged in the rear through holes 32. The contact point portions 47 of the rear resilient contact portions 46 formed in the front electrically conductive member 40 and the contact point portions 47 of the front resilient contact portions 46 formed in the rear electrically conductive member 40 are arranged in the central through holes 32 in the front-rear direction.

As shown in FIGS. 1 and 2, each adapter 60 has a cylindrical shape elongated in the vertical direction as a whole. As shown in FIG. 1, the adapter 60 is configured such that a relay inner conductor 61 is accommodated in a relay dielectric 62 and the relay dielectric 62 is surrounded by the hollow cylindrical relay outer conductor 63. Both end parts of the relay inner conductor 61 are connected to the first board-side inner conductor 17 and the second board-side inner conductor 27. Both end parts of the relay outer conductor 63 are connected to the first board-side outer conductor 19 and the second board-side outer conductor 29. As shown in FIG. 2, a step portion 64 and a locking projection 65 are formed on the outer periphery of the relay outer conductor 63. A lower end part of the adapter 60 is fit to the first shield terminal 16. The adapter 60 is swingable in the front-rear direction and lateral direction with a fit part to the first shield terminal 16 as a fulcrum.

The six adapters 60 are assembled with the alignment member 31 by being individually inserted into the respective through holes 32 from below. At this time, since the cut surfaces 48 on the lower end edges of the contact point portions 47 of the electrically conductive members 40 are arranged at the positions more distant from the adapters 60 than from the contact point portions 47, the outer peripheral surfaces of the relay outer conductors 63 are not damaged by the edges of the cut surfaces 48. The alignment member 31 is held at a predetermined height not to be displaced downward with respect to the adapters 60 by the contact of hole edge parts of the through holes 32 with the step portions 64. The adapters 60 are restricted from being separated downward from the alignment member 31 by locking the locking projections 65 to the hole edge parts of the through holes 32. The six adapters 60 are coupled to be integrally swingable in the front-rear direction and lateral direction by being attached to the alignment member 31.

In each through hole 32, the contact point portion 47 is resiliently in contact with the outer peripheral surface of the relay outer conductor 63. By the resilient deformation of the resilient contact portion 46, a predetermined contact pressure is ensured between the contact point portion 47 and the relay outer conductor 63. The two relay outer conductors 63 passed through the front through holes 32 and the two relay outer conductors 63 passed through the central through holes 32 in the front-rear direction are made conductive and held at the same potential via the front electrically conductive member 40. The two relay outer conductors 63 passed through the rear through holes 32 and the two relay outer conductors 63 passed through the central through holes 32 in the front-rear direction are made conductive and held at the same potential via the rear electrically conductive member 40. In this way, all the six relay outer conductors 63 are held at the same potential by the two electrically conductive members 40.

The connector device A of the first embodiment is provided with the first circuit board 11 including the first board transmission paths 13, the second circuit board 21 including the second board transmission paths 23 and arranged to face the first circuit board 11, and the first and second connectors 14, 24 individually mounted on the first and second circuit boards 11, 21. The connector device A further includes the plurality of adapters 60 including the relay outer conductors 63 and connecting the first and second connectors 14, 24, and the electrically conductive members 40 made of metal for making the plurality of relay outer conductors 63 conductive with each other.

Figure 7:
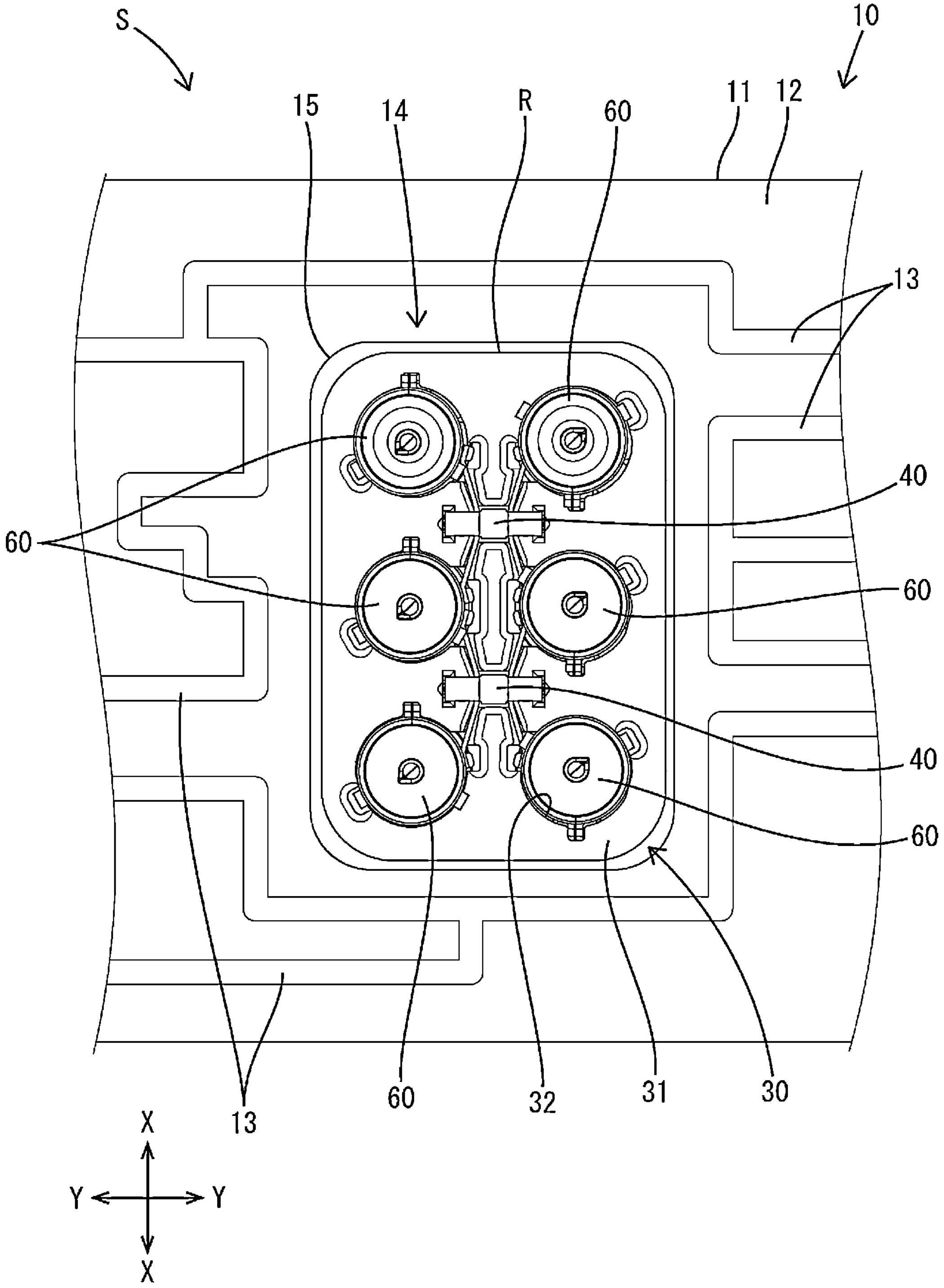
FIG. 7 is a plan view showing the arrangement of an inclusion region, board transmission paths and the electrically conductive members on a virtual projection plane.

In a plan view of the first circuit board 11 and the relay module 30, a plane parallel to the first mounting surface 12 is defined as a virtual projection plane S. FIG. 7 shows the first circuit board 11 and the relay module 30 projected on the virtual projection plane S. On the virtual projection plane S, a region including the six adapters 60 is defined as an inclusion region R. In the first embodiment, a region surrounded by the outer peripheral edge of the alignment member 31 is the inclusion region R. The outer peripheral edge of the alignment member 31 is a boundary of the inclusion region R. On the virtual projection plane S, the first board transmission paths 13 are arranged only outside the inclusion region R and the electrically conductive members 40 are arranged only within the inclusion region R.

Unlike the first embodiment, if electrically conductive members and first board transmission paths are arranged to overlap on the virtual projection plane S, a minimum height difference between the first board transmission paths and the electrically conductive members in a height direction orthogonal to the virtual projection plane S is a shortest distance between the electrically conductive members and the first board transmission paths. In contrast, in the first embodiment, a shortest distance L between the electrically conductive members 40 and the first board transmission paths 13, i.e. a distance L connecting a point T of the first transmission path 13 and a point C of the electrically conductive member 40, is larger than a minimum height difference H between the first board transmission paths 13 and the electrically conductive members 40. Since the electrically conductive members 40 are arranged at positions separated from the first board transmission paths 13 on the virtual projection plane S and in the height direction, the occurrence of resonance between the first board transmission paths 13 and the electrically conductive members 40, which are metal components, can be suppressed. Although not shown, the second board transmission paths 23 of the second circuit board 21 are also arranged only outside the inclusion region R on the virtual projection plane S. Thus, the occurrence of resonance between the second board transmission paths 23 and the electrically conductive members 40 can be suppressed.

The plurality of adapters 60 are aligned and arranged side by side along two front-rear direction and lateral direction perpendicular to each other, i.e. X and Y directions in FIG. 7 on the virtual projection plane S. The electrically conductive members 40 are arranged between adjacent ones of the adapters 60. According to this configuration, since the adapters 60 are interposed between the first board transmission paths 13 and the electrically conductive members 40 and between the second board transmission paths 23 and the electrically conductive members 40 on the virtual projection plane S, it is possible to ensure relatively large distances between the first board transmission paths 13 and the electrically conductive members 40 and between the second board transmission paths 23 and the electrically conductive members 40.

The connector device A is provided with the electrically nonconductive alignment member 31 for integrally swingably holding the plurality of adapters 60. The electrically conductive members 40 are attached to the alignment member 31. According to this configuration, since the electrically conductive members 40 need not have a function of integrally swingably holding the plurality of adapters 60, the electrically conductive members 40 could be suppressed to a minimum necessary size.

The electrically conductive member 40 is a single component including the resilient contact portions 46 to be brought into resilient contact with the relay outer conductors 63, the press-fit portions 50 to be press-fit into the alignment member 31 and the linking portions 43 linking the resilient contact portions 46 and the press-fit portions 50. According to this configuration, since the press-fit portions 50 are separated from the resilient contact portions 46 via the linking portions 43, it can be suppressed that stress generated in the resilient contact portion 46 is applied to the press-fit portions 50 when the resilient contact portion 46 is resiliently deformed by resiliently contacting the relay outer conductor 63. In this way, the electrically conductive member 40 can be reliably assembled with the alignment member 31.

The electrically conductive member 40 is made from the press-worked plate having the cut surface 48 exposed on the outer peripheral edge. The alignment member 31 includes the through holes 32, through which the adapters 60 are passed. The resilient contact portions 46 are arranged along the hole edges of the through holes 32. The resilient contact portion 46 is formed with the bent portion 49. The bent portion 49 is formed by bending the cut surface 48 away from the outer peripheral surface of the relay outer conductor 63 of the adapter 60 in a radial direction of the through hole 32. According to this configuration, the outer peripheral surface of the relay outer conductor 63 can be prevented from being damaged by the edge of the cut surface 48 of the resilient contact portion 46.

Second Embodiment

A second specific embodiment of the connector device of the present disclosure is described with reference to FIGS. 8 to 10. The connector device of the second embodiment differs from that of the first embodiment in the configurations of an alignment member 71 and electrically conductive members 76. Since the other components and the definition of directions are the same as in the first embodiment, the same components are denoted by the same reference signs and the structures, functions and effects thereof are not described.

Figure 8:
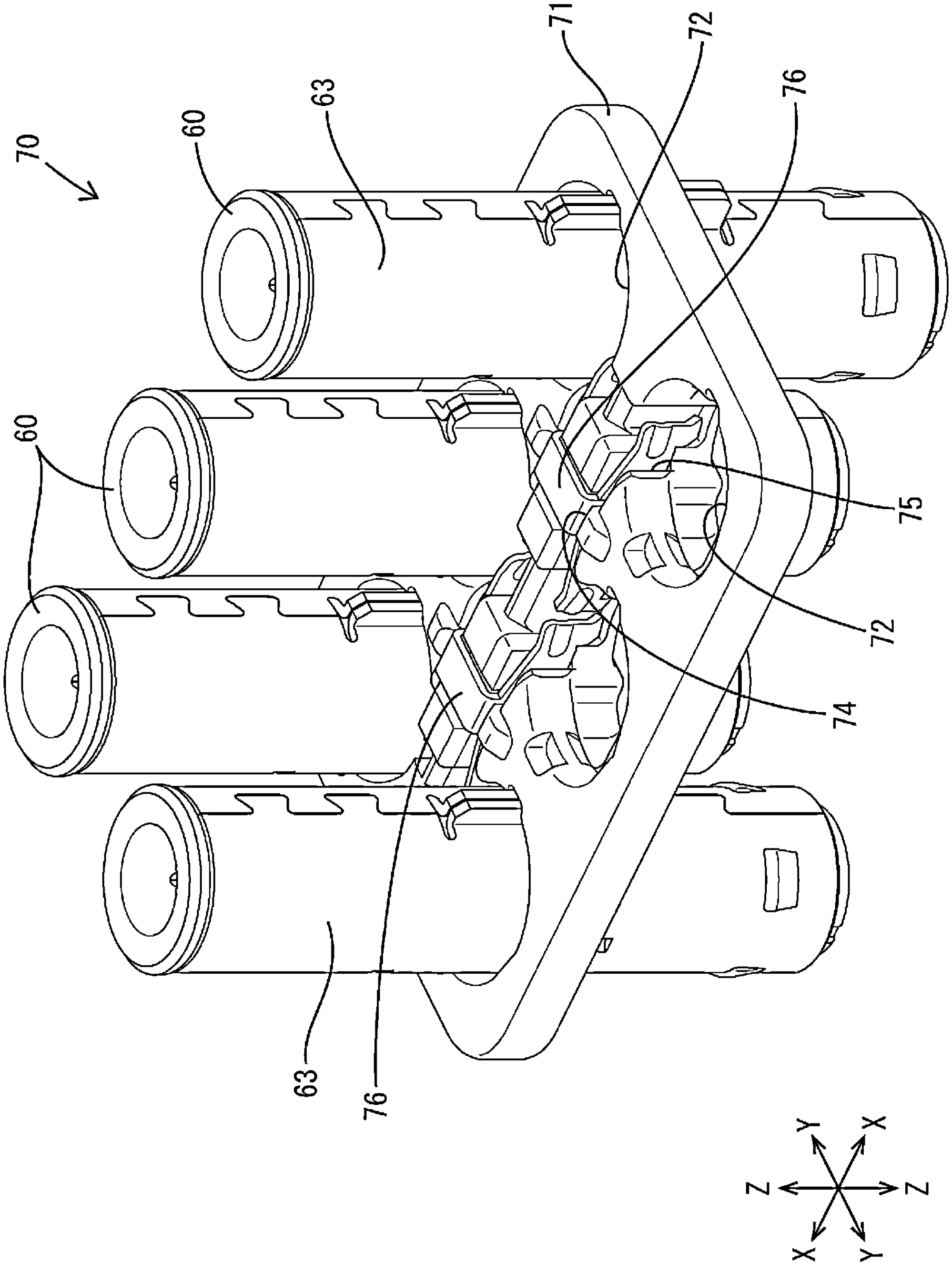
FIG. 8 is a perspective view showing a state where electrically conductive members and adapters are attached to an alignment member in a second embodiment.
Figure 9:
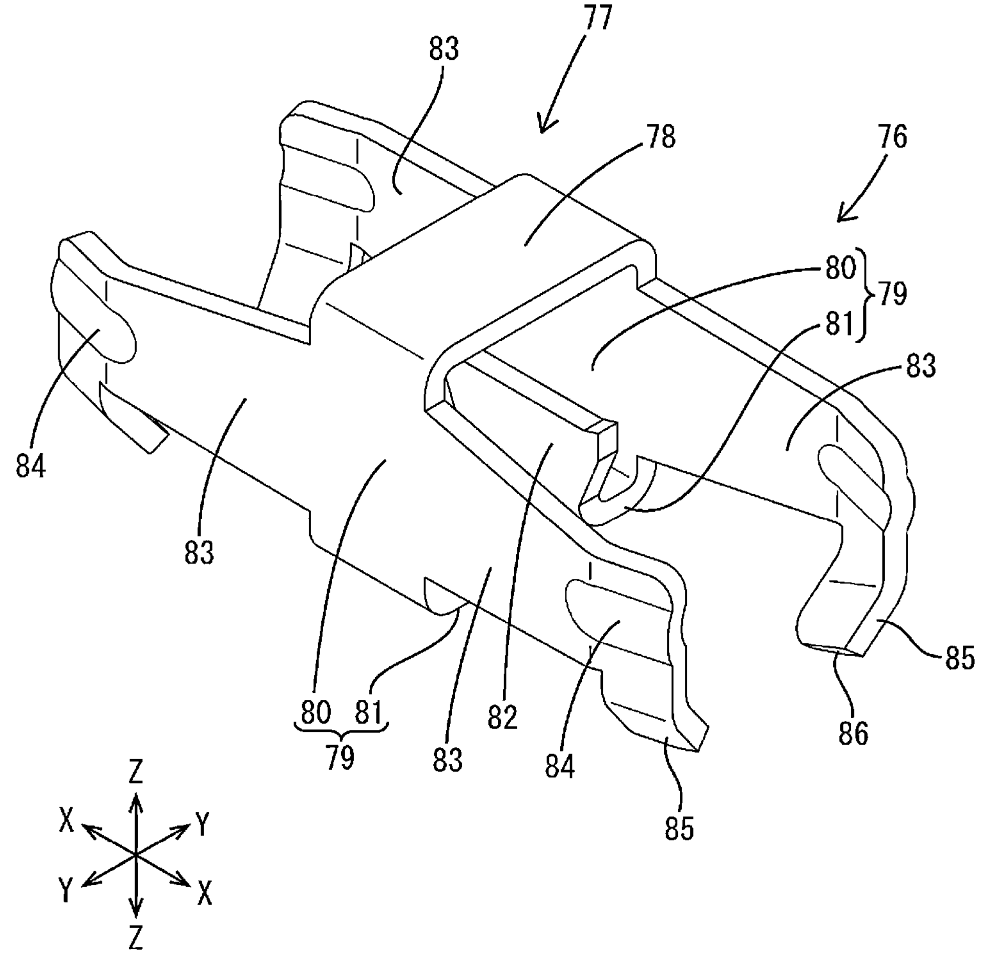
FIG. 9 is a perspective view of the electrically conductive member.

As shown in FIG. 8, a relay module 70 is provided with one alignment member 71, two electrically conductive members 76 and six adapters 60. The adapters 60 are the same components as those of the first embodiment. The alignment member 71 is made of an insulating material such as synthetic resin and in the form of a plate having a plate thickness direction oriented in the vertical direction as a whole. The alignment member 71 has a rectangular shape having long sides extending in the front-rear direction as a whole in a plan view. The alignment member 71 is formed with six through holes 72 penetrating through the alignment member 71 in the vertical direction in the same arrangement as first shield terminals 16 (not shown) and second shield terminals 26 (not shown).

Figure 10:
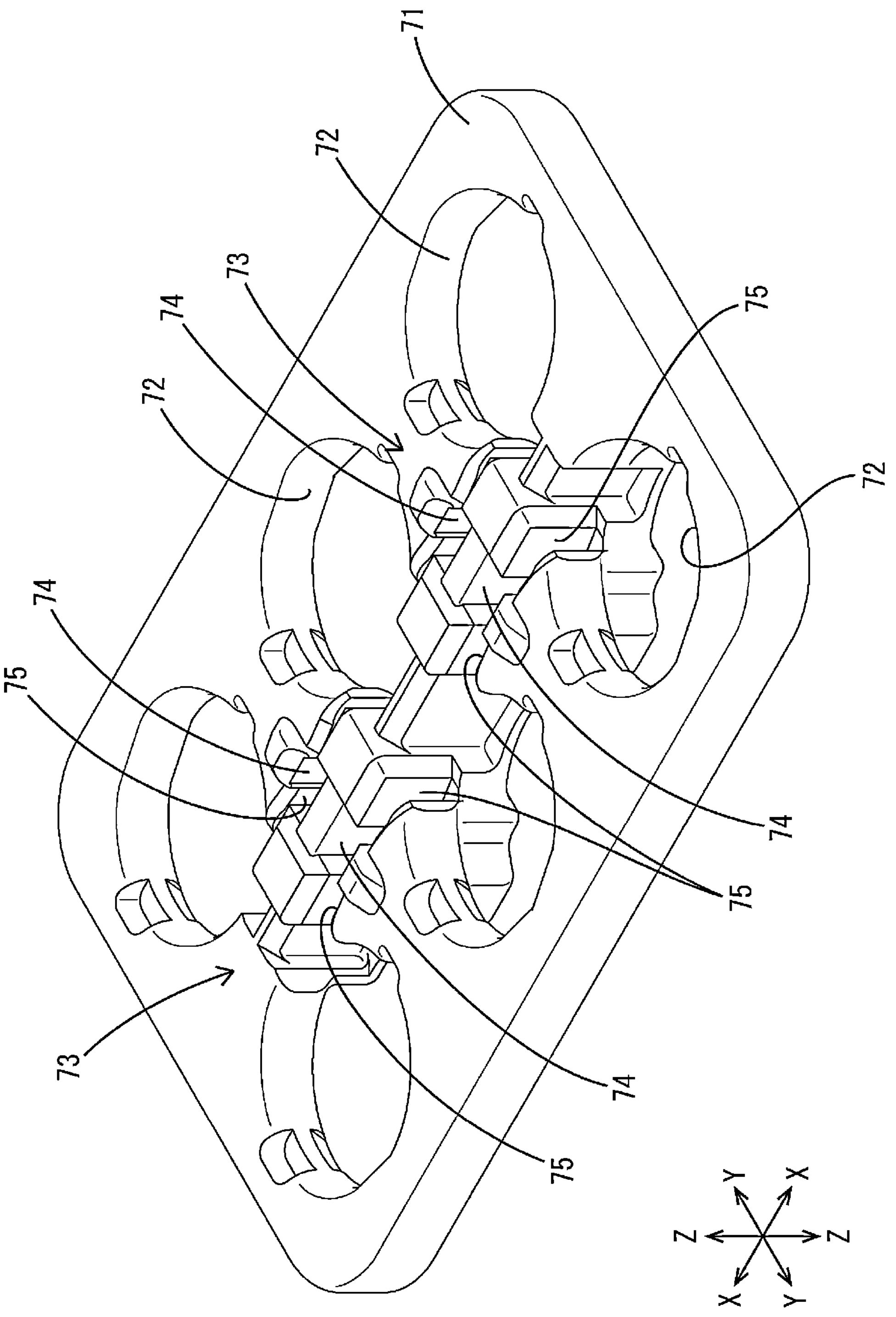
FIG. 10 is a perspective view of the alignment member.

As shown in FIG. 10, the alignment member 71 is formed with two front and rear accommodation recesses 73 formed by recessing the upper surface of the alignment member 71. The front accommodation recess 73 is arranged in a region surrounded by two front through holes 72 and two central through holes 72 in the front-rear direction. The rear front accommodation recess 73 is arranged in a region surrounded by two rear through holes 72 and the two central through holes 72 in the front-rear direction. The accommodation recess 73 is composed of a pair of press-fit holes 74 and two pairs of groove portions 75. The pair of press-fit holes 74 are spaced apart in the lateral direction in a region surrounded by four through holes 72 aligned adjacent to each other in the front-rear direction and lateral direction. The groove portions 75 juxtaposed and paired in the front-rear direction are arranged to allow the press-fit hole 74 and two through holes 72 adjacently arranged on both front and rear sides of the press-fit hole 74 to individually communicate.

The electrically conductive member 76 is a single component formed by bending a metal plate material having a predetermined shape. As shown in FIG. 9, the electrically conductive member 76 has a front-rear symmetrical and bilaterally symmetrical shape. The electrically conductive member 76 includes a base portion 77 having a bent shape, a pair of bilaterally symmetrical press-fit portions 82, and two pairs of front and rear resilient contact portions 83. The base portion 77 is composed of a horizontal upper plate portion 78 and a pair of left and right linking portions 79. The linking portions 79 are composed of a pair of left and right side plate portions 80 extending downward from both left and right side edges of the upper plate portion 78 and a pair of lower plate portions 81 connected at a right angle to the lower end edges of the both side plate portions 80. The pair of lower plate portions 81 horizontally extend in directions toward each other. The press-fit portions 82 are at a right angle to the lower plate portions 81 and cantilevered upward from the extending end edges of the lower plate portions 81. One press-fit portion 82 is linked to two front and rear resilient contact portions 83 via the linking portion 79.

Two front resilient contact portions 83 are cantilevered forward from the front end edges of the side plate portions 80. The two front resilient contact portions 83 are spaced apart in the lateral direction, and bent into a chevron shape to bulge toward sides opposite to each other in a plan view. Two rear resilient contact portions 83 are cantilevered rearward from the rear end edges of the side plate portions 80. The two rear resilient contact portions 83 are spaced apart in the lateral direction, and bent into a chevron shape to bulge toward sides opposite to each other in a plan view. A top part of the chevron shape of the resilient contact portion 83 functions as a contact point portion 84 to be brought into contact with a relay outer conductor. The resilient contact portion 83 can be resiliently displaced in the lateral direction with a boundary with the side plate portion 80 (base end part connected to the side plate portion 80) as a fulcrum.

A lower end part of the contact point portion 84 is formed with a bent portion 85 bent toward a side opposite to a contact surface of the contact point portion 84 with the adapter 60. By forming the bent portion 85, a cut surface 86 is arranged at a position retracted toward a side opposite to the adapter 60 across the contact point portion 84 in a plan view. When the adapter 60 is inserted into the through hole 72 from below, the edge of the cut surface 86 does not damage the outer peripheral surface of the adapter 60.

The electrically conductive member 76 is assembled with the alignment member 71 by being fit into the accommodation recess 73. Specifically, the press-fit portions 82 are press-fit into the press-fit holes 74, and the resilient contact portions 83 are accommodated into the groove portions 75. The tips of the press-fit portions 82 are hooked to the inner wall surfaces of the press-fit holes 74, whereby the electrically conductive member 76 is held assembled with the alignment member 71.

The contact point portions 84 of the front resilient contact portions 83 formed in the front electrically conductive member 76 are arranged in the front through holes 72. The contact point portions 84 of the rear resilient contact portions 83 formed in the rear electrically conductive member 76 are arranged in the rear through holes 72. The contact point portions 84 of the rear resilient contact portions 83 formed in the front electrically conductive member 76 and the contact point portions 84 of the front resilient contact portions 83 formed in the rear electrically conductive member 76 are arranged in the central through holes 72 in the front-rear direction.

Third Embodiment

Figure 11:
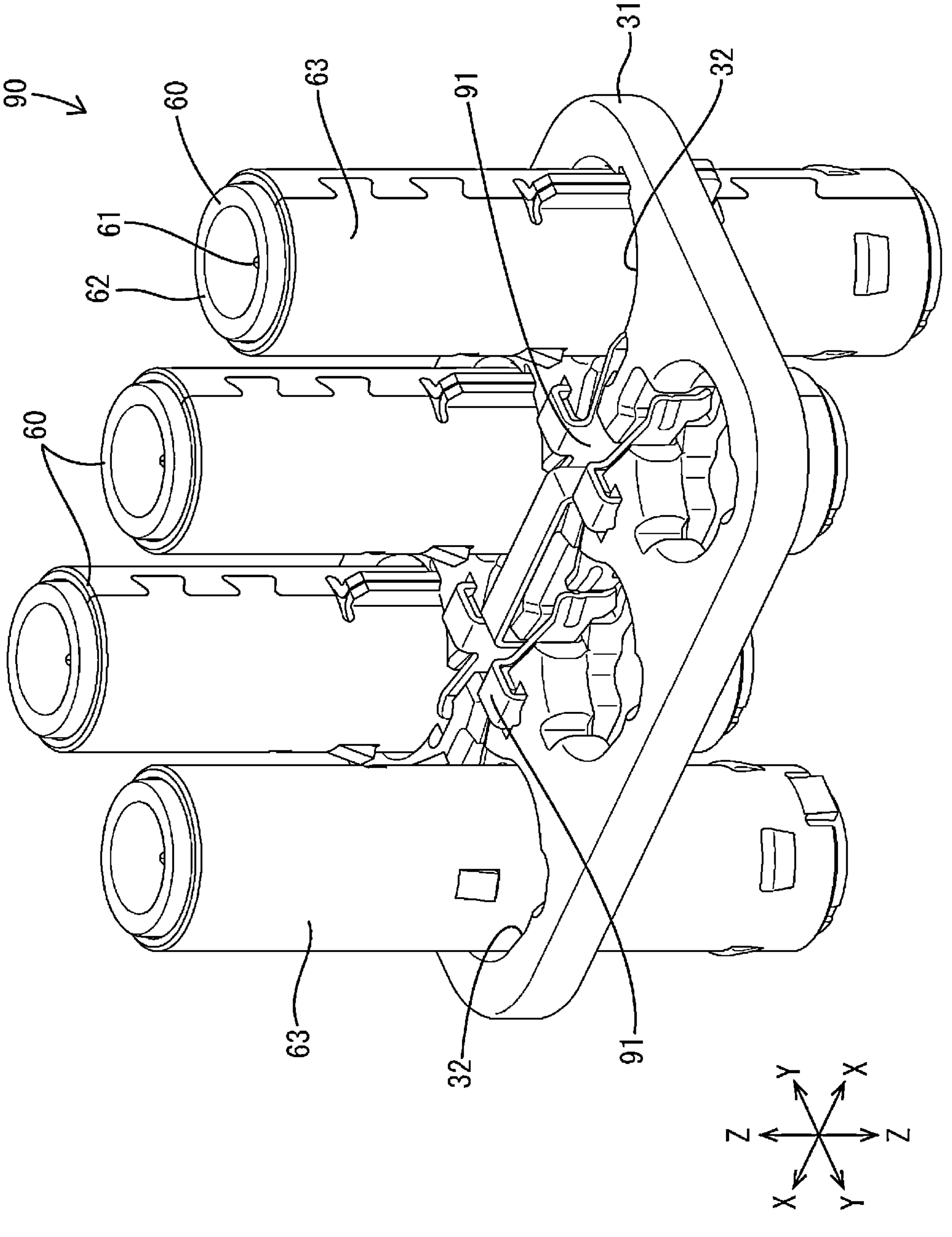
FIG. 11 is a perspective view showing a state where an electrically conductive member and adapters are attached to an alignment member in a third embodiment.
Figure 12:
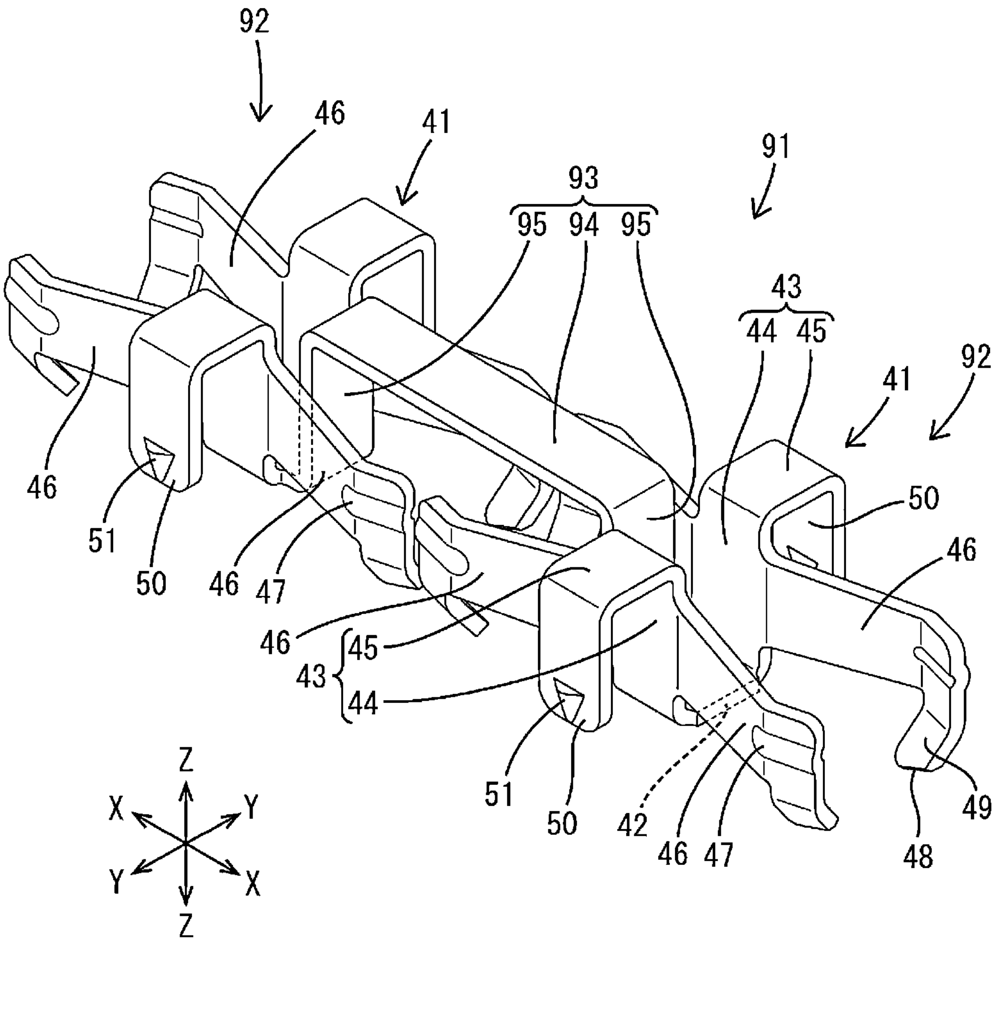
FIG. 12 is a perspective view of the electrically conductive member.
Figure 13:
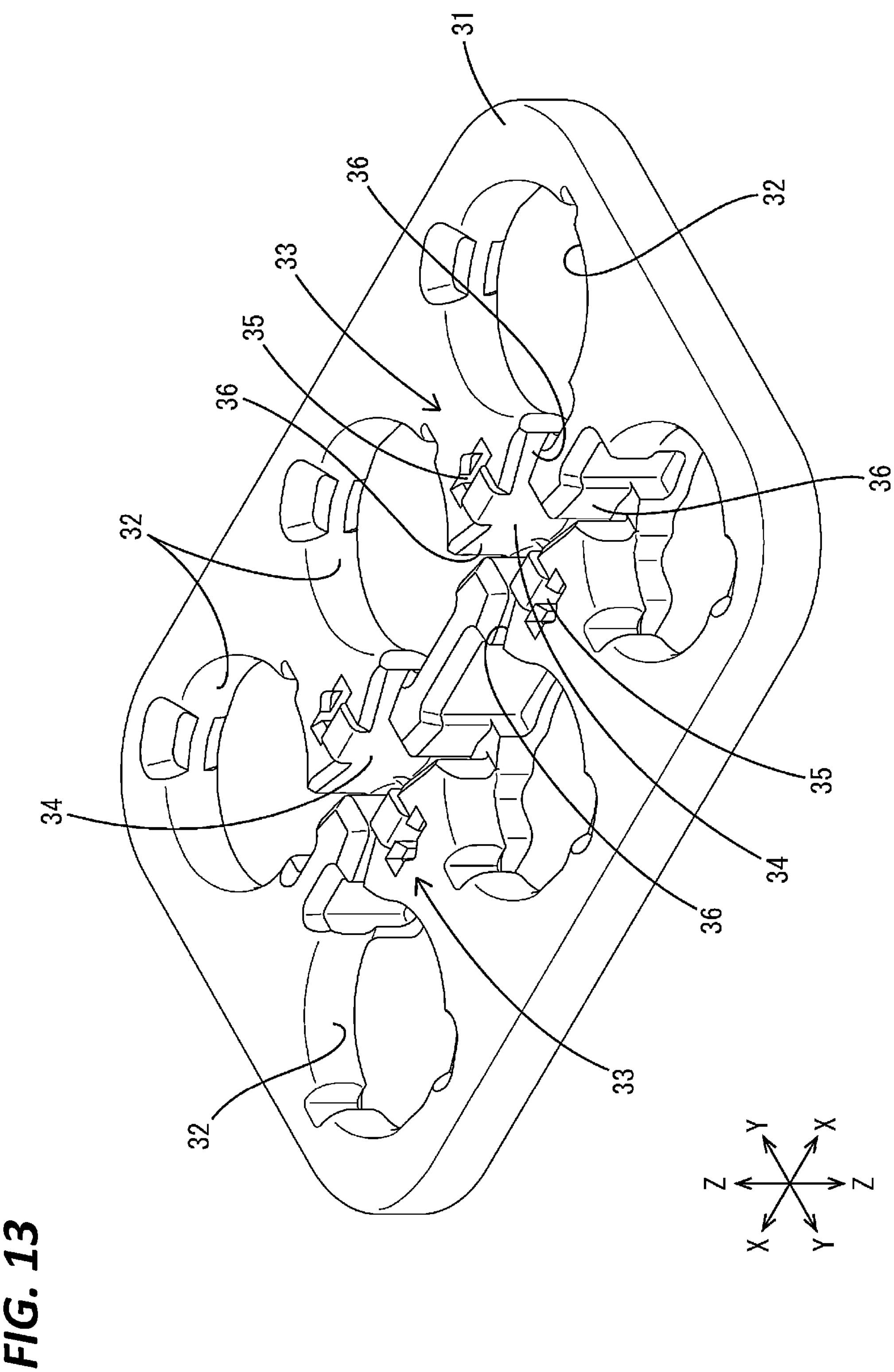
FIG. 13 is a perspective view of the alignment member.

A third specific embodiment of the connector device of the present disclosure is described with reference to FIGS. 11 to 13. The connector device of the third embodiment differs from that of the first embodiment in the configuration of an electrically conductive member 91. Since the other components and the definition of directions are the same as in the first embodiment, the same components are denoted by the same reference signs and the structures, functions and effects thereof are not described.

A relay module 90 of the third embodiment is provided with one alignment member 31, one electrically conductive member 91 and six adapters 60. The alignment member 31 and the adapters 60 are the same components as those of the first embodiment.

The electrically conductive member 91 is a single component formed by bending a metal plate material having a predetermined shape, and has a front-rear symmetrical and bilaterally symmetrical shape. As shown in FIG. 12, the electrically conductive member 91 is configured such that two conductive portions 92 having the same shape as the electrically conductive members 40 of the first embodiment are arranged side by side in the front-rear direction and linked via a coupling portion 93. Constituent parts of the conductive portion 92 are denoted by the same reference signs as those of the electrically conductive member 40 of the first embodiment. The coupling portion 93 is composed of a base plate portion 94 elongated in the front-rear direction and a pair of end plate portions 95 extending downward from both front and rear end edges of the base plate portion 94. The lower end edge of the end plate portion 95 is linked at a right angle to the front or rear edge of a lower plate portion 42.

The electrically conductive member 91 is assembled with the alignment member 31 as in the first embodiment. Specifically, base portions 41 and the end plate portions 95 are accommodated into central recesses 34, resilient contact portions 46 are accommodated in groove portions 36 and press-fit portions 50 are press-fit into press-fit holes 35. Retaining projections 51 of the press-fit portions 50 bite into the inner walls of the press-fit holes 35, whereby the electrically conductive member 91 is held assembled with the alignment member 31. As in the first embodiment, one contact point portion 47 is arranged in each of two front through holes 32 and two rear through holes 32. Two contact point portions 47 are arranged in each of two central through holes 32 in the front-rear direction.

Other Embodiments

The present invention is not limited to the above described and illustrated embodiments, but is represented by claims. The present invention is intended to include all changes in the scope of claims and in the meaning and scope of equivalents and also include the following embodiments.

Although the electrically conductive member(s) is/are arranged between adjacent ones of the adapters in the above first to third embodiments, the electrically conductive members may be arranged not between adjacent ones of the adapters, but between the adapters and the boundary of the inclusion region.

Although the electrically conductive member(s) is/are attached to the alignment member in the above first to third embodiments, the plurality of adapters may be made integrally swingable by directly coupling the electrically conductive member(s) to the adapters without using the alignment member.

Although the region surrounded by the outer peripheral edge of the alignment member is the inclusion region in the above first to third embodiments, the inclusion region may be a rectangular region circumscribing the six adapters or may be a region surrounded by the outer peripheral edge of the first housing on the virtual projection plane.

Although six adapters are provided in the above first to third embodiments, five or less or seven or more adapters may be provided.

Although the plurality of adapters are aligned and arranged in the front-rear direction and lateral direction in the above first to third embodiments, the plurality of adapters may be randomly arranged.

LIST OF REFERENCE NUMERALS

A . . . connector device
H . . . minimum height difference between first board transmission paths and electrically conductive members
L . . . shortest distance between electrically conductive members and first board transmission paths
R . . . inclusion region
S . . . virtual projection plane
10 . . . first board module
11 . . . first circuit board (circuit board)
12 . . . first mounting surface
13 . . . first board transmission path (board transmission path)
14 . . . first connector (connector)
15 . . . first housing
16 . . . first shield terminal
17 . . . first board-side inner conductor
18 . . . first board-side dielectric
19 . . . first board-side outer conductor
20 . . . second board module
21 . . . second circuit board (circuit board)
22 . . . second mounting surface
23 . . . second board transmission path (board transmission path)
24 . . . second connector (connector)
25 . . . second housing
26 . . . second shield terminal
27 . . . second board-side inner conductor
28 . . . second board-side dielectric
29 . . . second board-side outer conductor
30 . . . relay module
31 . . . alignment member
32 . . . through hole
33 . . . accommodation recess
34 . . . central recess
35 . . . press-fit hole
36 . . . groove portion
40 . . . electrically conductive member
41 . . . base portion
42 . . . lower plate portion
43 . . . linking portion
44 . . . side plate portion
45 . . . upper plate portion
46 . . . resilient contact portion
47 . . . contact point portion
48 . . . cut surface
49 . . . bent portion
50 . . . press-fit portion
51 . . . retaining projection
60 . . . adapter
61 . . . relay inner conductor
62 . . . relay dielectric
63 . . . relay outer conductor (outer conductor)
64 . . . step portion
65 . . . locking projection
70 . . . relay module
71 . . . alignment member
72 . . . through hole
73 . . . accommodation recess
74 . . . press-fit hole
75 . . . groove portion
76 . . . electrically conductive member
77 . . . base portion
78 . . . upper plate portion
79 . . . linking portion
80 . . . side plate portion
81 . . . lower plate portion
82 . . . press-fit portion
83 . . . resilient contact portion
84 . . . contact point portion
85 . . . bent portion
86 . . . cut surface
90 . . . relay module
91 . . . electrically conductive member
92 . . . conductive portion
93 . . . coupling portion
94 . . . base plate portion
95 . . . end plate portion

What is claimed is:

1. A connector device, comprising:

a pair of circuit boards including board transmission paths, the circuit boards being arranged to face each other;

a pair of connectors to be individually mounted on the pair of circuit boards;

a plurality of adapters including outer conductors, the adapters connecting the pair of connectors;

an electrically nonconductive alignment portion for integrally and swingably holding the plurality of adapters; and an electrically conductive portion made of metal, the electrically conductive portion being attached to the alignment portion and making a plurality of the outer conductors conductive, the board transmission paths being arranged outside an inclusion region including the plurality of adapters on a virtual projection plane parallel to the circuit boards, and the electrically conductive portion being arranged only within the inclusion region on the virtual projection plane.

2. The connector device of claim 1, wherein:

the plurality of adapters are aligned and arranged side by side along two perpendicular directions on the virtual projection plane, and the electrically conductive portion is arranged to be sandwiched between adjacent ones of the adapters.

3. The connector device of claim 1, wherein the electrically conductive portion is a single component including resilient contact portions to be brought into resilient contact with the outer conductors, a press-fit portion to be press-fit into the alignment portion and a linking portion linking the resilient contact portions and the press-fit portion.

4. The connector device of claim 3, wherein:

the electrically conductive portion is made from a press-worked plate having a cut surface exposed on an outer peripheral edge, the alignment portion includes through holes for allowing the adapters to be passed therethrough, the resilient contact portions are arranged along hole edges of the through holes, and the resilient contact portion is formed with a bent portion bent to keep the cut surface away from the adapter in a radial direction of the through hole.

5. The connector device of claim 1, wherein the alignment portion is made of an insulating material.

6. The connector device of claim 1, wherein on the virtual projection plane, the board transmission paths are disposed outside the electrically conductive portion so as not to overlap the electrically conductive portion.

* * * * *